United States Patent
Griffioen

(10) Patent No.: US 9,351,337 B2
(45) Date of Patent: May 24, 2016

(54) VIRTUAL INTER-PROCESS COMMUNICATION BETWEEN A RADIO EQUIPMENT AND A RADIO EQUIPMENT CONTROLLER IN A BASE STATION OF A WIRELESS COMMUNICATION SYSTEM

(75) Inventor: Robert Griffioen, Ottawa (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 791 days.

(21) Appl. No.: 13/221,951

(22) Filed: Aug. 31, 2011

(65) Prior Publication Data

US 2013/0055286 A1 Feb. 28, 2013

(51) Int. Cl.

| | |
|---|---|
| G06F 3/00 | (2006.01) |
| G06F 9/44 | (2006.01) |
| G06F 9/46 | (2006.01) |
| G06F 13/00 | (2006.01) |
| H04W 88/08 | (2009.01) |
| H04W 92/12 | (2009.01) |

(52) U.S. Cl.
CPC .............. *H04W 88/08* (2013.01); *H04W 92/12* (2013.01)

(58) Field of Classification Search
None
See application file for complete search history.

(56) References Cited

U.S. PATENT DOCUMENTS

| | | | |
|---|---|---|---|
| 7,051,108 B1 | 5/2006 | Jones et al. | |
| 7,805,560 B2 | 9/2010 | Asaro et al. | |
| 2003/0227941 A1 | 12/2003 | Lee | |
| 2004/0029575 A1* | 2/2004 | Mehta | 455/419 |
| 2005/0278410 A1* | 12/2005 | Espino | 709/201 |
| 2007/0087739 A1 | 4/2007 | Jung | |
| 2011/0014908 A1* | 1/2011 | Eiza et al. | 455/423 |
| 2011/0110315 A1* | 5/2011 | Chen et al. | 370/329 |

FOREIGN PATENT DOCUMENTS

WO 2005006133 A2 1/2005

OTHER PUBLICATIONS

"High-Performance Interprocess Communications" ENEA LINX Data Sheet, 2009, 2pages. http://www.enea.com/software/resources/documents/Interprocess-Communication/Remove-this-subtitle/Enea-LINX/, retrieved Nov. 7, 2012.*
International Search Report for International Patent Application No. PCT/IB2012/054478 mailed Dec. 11, 2012, 13 pages.
International Preliminary Report on Patentability for International Patent Application No. PCT/IB2012/054478 mailed Mar. 13, 2014, 9 pages.

* cited by examiner

*Primary Examiner* — H S Sough
*Assistant Examiner* — William C Wood
(74) *Attorney, Agent, or Firm* — Withrow & Terranova, PLLC

(57) ABSTRACT

Embodiments of a Radio Equipment (RE), and methods of operation thereof, are disclosed. In one embodiment, the RE is designed for Inter-Process Communication (IPC) and is connected to a Radio Equipment Controller (REC) that does not support IPC. In operation, the RE receives a non-IPC message from the REC. An IPC translator of the RE then translates the non-IPC message into an equivalent IPC message and provides the equivalent IPC message to a corresponding process operating on the RE. In one embodiment, multiple processes are operating on the RE, and the IPC translator provides the equivalent IPC message to one of the processes that is responsible for handling the equivalent IPC message. As a result of the IPC translator, IPC signaling occurring at the RE is transparent to the REC.

32 Claims, 7 Drawing Sheets

VIRTUAL INTER-PROCESS COMMUNICATION BETWEEN A RADIO EQUIPMENT AND A RADIO EQUIPMENT CONTROLLER IN A BASE STATION OF A WIRELESS COMMUNICATION SYSTEM

FIELD OF THE DISCLOSURE

The present disclosure relates to a base station in a wireless communication system and more specifically relates to virtual inter-process communication between a radio equipment and a radio equipment controller forming at least part of a base station in a wireless communication system.

BACKGROUND

Wireless communications systems generally include numerous base stations that provide voice and/or data services to mobile stations (e.g., mobile phones) located within corresponding cells, or coverage areas, of the base stations. In some wireless communications systems such as, for example, Universal Mobile Telecommunication System (UMTS) communications systems, WiMAX communications systems, and Evolved UMTS Terrestrial Radio Access (E-UTRA) communications systems, each base station includes a Radio Equipment (RE) connected to a Radio Equipment Controller (REC). While not limited thereto, the RE and the REC may be connected via a Common Public Radio Interface (CPRI) link.

In some implementations, the RE is designed to support Inter-Process Communication (IPC) signaling between the RE and the REC. However, depending on the manufacturer of the REC, the REC may or may not support IPC. Thus, there is a need for systems and methods that enable a RE that is designed to support IPC to be used with an REC that does not support IPC.

SUMMARY

Embodiments of a Radio Equipment (RE), and methods of operation thereof, are disclosed. In one embodiment, the RE is designed for Inter-Process Communication (IPC) and is connected to a Radio Equipment Controller (REC) that does not support IPC. In operation, the RE receives a non-IPC message from the REC. An IPC translator of the RE then translates the non-IPC message into an equivalent IPC message and provides the equivalent IPC message to a corresponding process operating on the RE. In one embodiment, multiple processes are operating on the RE, and the IPC translator provides the equivalent IPC message to one of the processes that is responsible for handling the equivalent IPC message. As a result of the IPC translator, IPC signaling occurring at the RE is transparent to the REC.

In another embodiment, the RE is designed for IPC and is connected to a REC that does not support IPC. In operation, the RE receives a non-IPC message from the REC. A Layer 3 translation function of the RE then translates the non-IPC message into an equivalent Layer 3 IPC message and provides the equivalent Layer 3 IPC message to a corresponding client process operating on the RE. The client process then processes the equivalent Layer 3 IPC message and sends an IPC message to a corresponding server process operating on the RE via a communications link that is internal to the RE.

In another embodiment, the RE is designed for IPC and is connected to a REC that does not support IPC. In operation, an IPC translator of the RE receives an IPC message from a process operating on the RE. The IPC translator then translates the IPC message into an equivalent non-IPC message and provides the equivalent non-IPC message from the RE to the REC. As a result of the IPC translator, IPC signaling occurring at the RE is transparent to the REC.

In another embodiment, the RE is designed for IPC and is connected to a REC that does not support IPC. One or more server processes and one or more client processes are operating on the RE. In operation, one of the client processes receives an IPC message from a corresponding server process. The client process processes the IPC message to provide a corresponding Layer 3 IPC message to a Layer 3 translation function of the RE. The Layer 3 translation function then translates the Layer 3 IPC message into an equivalent non-IPC message and provides the equivalent non-IPC message from the RE to the REC.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
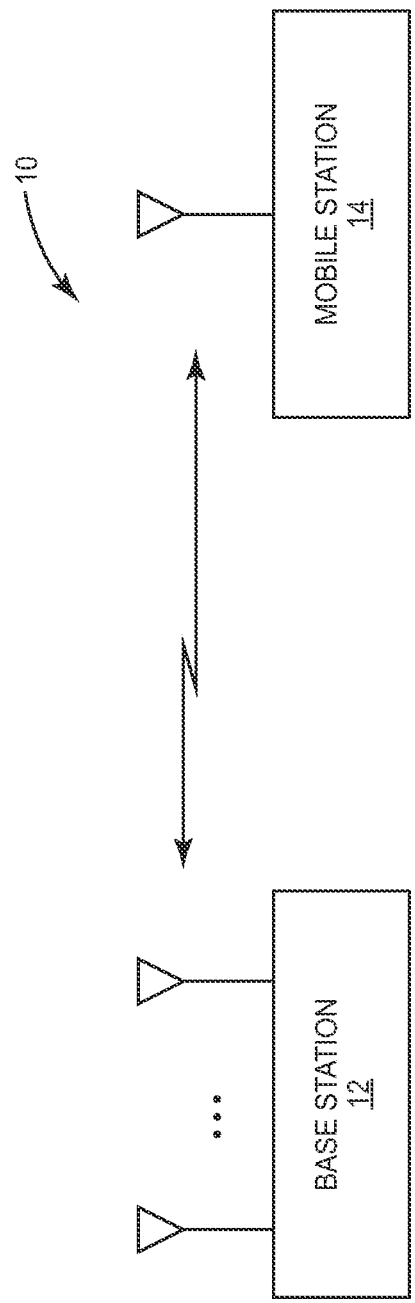
FIG. 1 illustrates a base station and a mobile station in a wireless communication system according to one embodiment of the present disclosure.

FIG. 1 illustrates a wireless communication system 10 according to one embodiment of the present disclosure. The wireless communication system 10 may be, for example, a Universal Mobile Telecommunication System (UMTS) wireless communication system, a WiMAX wireless communication system, or a Evolved UMTS Terrestrial Radio Access (E-UTRA) wireless communication system. Note, however, that the wireless communication system 10 is not limited thereto. The wireless communication system 10 includes a base station 12 and a mobile station 14. While FIG. 1 illustrates only one base station 12 and one mobile station 14, it will be readily appreciated that the wireless communication system 10 generally includes numerous base stations 12 each serving numerous mobile stations 14 located within corresponding service areas (e.g., cells) in the wireless communication system 10. In general, the base station 12 transmits signals to and receives signals from mobile stations, such as the mobile station 14, within the service area of the base station 12.

Figure 2:
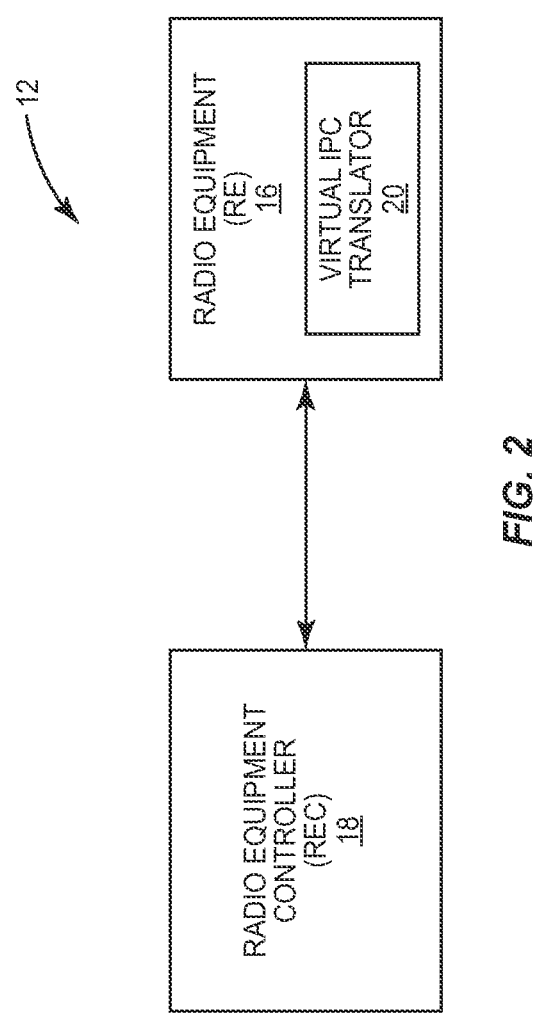
FIG. 2 illustrates the base station of FIG. 1 in more detail where the base station includes a Radio Equipment (RE) and a Radio Equipment Controller (REC) according to one embodiment of the present disclosure.

As illustrated in FIG. 2, the base station 12 includes a Radio Equipment (RE) 16 and a Radio Equipment Controller (REC) 18. The RE 16 and the REC 18 are separate physical, or hardware, nodes that are connected via a communications link. In one embodiment, the communications link is a Common Public Radio Interface (CPRI) link provided over an electrical or optical interface (i.e., Layer 1 of the CPRI link is either an electrical interface or an optical interface). In this particular embodiment, the RE 16 includes a protocol stack that supports an Inter-Process Communications (IPC) protocol. More specifically, at least a portion of the protocol stack of the RE 16 is designed for IPC. However, the REC 18 does not support IPC between processes operating on the REC 18 and processes operating on the RE 16. As such, the RE 16 includes a virtual IPC translator 20 (hereinafter "IPC translator 20") that operates to translate incoming non-IPC messages from the REC 18 into equivalent IPC messages and to translate outgoing IPC messages into equivalent non-IPC messages, as discussed below in detail. As used herein, a non-IPC message is a message provided to the RE 16 from the REC 18 according to a protocol that does not support IPC. Similarly, as used herein, an IPC message is a message provided according to an IPC protocol supported by the RE 16.

Before proceeding, those skilled in the art will appreciate that the block diagram of the base station 12 in FIG. 2 necessarily omits numerous features that are not necessary to a complete understanding of this disclosure. For instance, although all of the details of the RE 16 are not illustrated, those skilled in the art will recognize that the RE 16 comprises one or several general-purpose or special-purpose microprocessors or other microcontrollers programmed with suitable software and/or firmware to carry out some or all of the functionality of the RE 16 described herein. In addition or alternatively, the RE 16 may comprise various digital hardware blocks (e.g., one or more Application Specific Integrated Circuits (ASICs), one or more off-the-shelf digital and analog hardware components, or a combination thereof) configured to carry out some or all of the functionality of the RE 16 described herein. Likewise, although all of the details of the REC 18 are not illustrated, those skilled in the art will recognize that the REC 18 comprises one or several general-purpose or special-purpose microprocessors or other microcontrollers programmed with suitable software and/or firmware to carry out some or all of the functionality of the REC 18 described herein. In addition or alternatively, the REC 18 may comprise various digital hardware blocks (e.g., one or more ASICs, one or more off-the-shelf digital and analog hardware components, or a combination thereof) configured to carry out some or all of the functionality of the REC 18 described herein.

Figure 3:
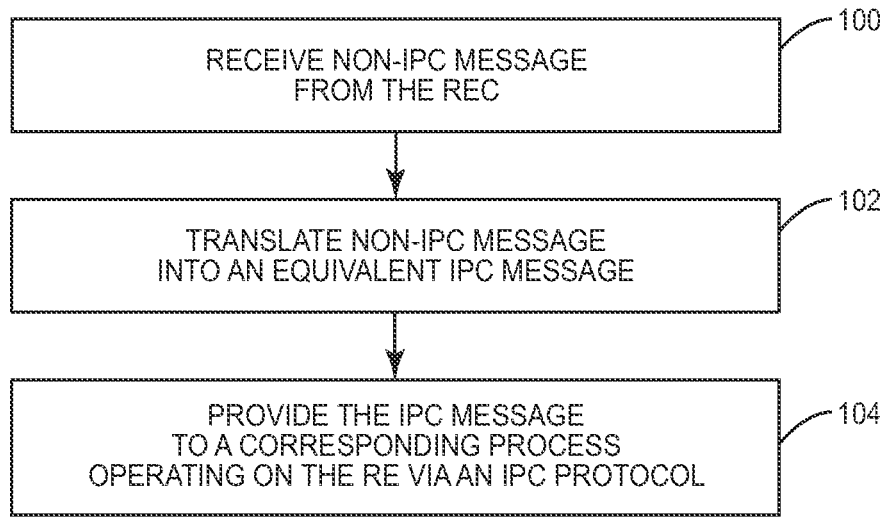
FIG. 3 illustrates the operation of the virtual Inter-Process Communication (IPC) translator of the RE of FIG. 2 to translate incoming non-IPC messages into equivalent IPC messages according to one embodiment of the present disclosure.

FIG. 3 illustrates the operation of the IPC translator 20 of the RE 16 of FIG. 2 to translate incoming non-IPC messages into equivalent IPC messages according to one embodiment of the present disclosure. First, the IPC translator 20 receives a non-IPC message from the REC 18 via the communication link between the RE 16 and the REC 18 (step 100). In one embodiment, the non-IPC message is an operations and maintenance message (i.e., a message related to operations and/or maintenance) provided on a control plane of the communication link between the RE 16 and the REC 18.

Next, the IPC translator 20 translates the non-IPC message into an equivalent IPC message (step 102). The details of the translation depend on the particular implementation of the RE 16 and the REC 18. For instance, the details of the translation depend, at least in part, on the IPC protocol supported by the RE 16. In one embodiment, the IPC protocol supported by the RE 16 is LINX. As will be appreciated by one of ordinary skill in the art, LINX utilizes a distributed protocol stack for transparent inter-node and inter-process communication for a heterogeneous mix of systems. In this particular embodiment, the RE 16 is designed to use LINX for inter-process communication between processes on the RE 16 and a connected REC over a CPRI interface. However, since the REC 18 does not support IPC, the IPC translator 20 translates the non-IPC message received from the REC 18 into a corresponding LINX signal, or message, which is the equivalent IPC message. For example, if the non-IPC message is an operations and maintenance message provided in a format specified for the REC 18, the IPC translator 20 translates the message into an equivalent operations and maintenance message in a format specified for the RE 16 and then wraps the equivalent operations and maintenance message inside a LINX signal, or message, to thereby provide the equivalent IPC message.

Lastly, the IPC translator 20 provides, or sends, the equivalent IPC message to a corresponding process operating on the RE 16 via an internal communication link that is internal to the RE 16 using the IPC protocol supported by the RE 16 (e.g., LINX) (step 104). In one embodiment, the internal communication link is a communications link provided within software executing on the RE 16 (e.g., a communications link provided by an operating system of the RE 16). More specifically, the IPC translator 20 sends the equivalent IPC message to the corresponding process via a link handler. For example, for LINX, the equivalent IPC message includes an identifier referred to as a signal number that identifies the process to which the equivalent IPC message is to be delivered. The link handler uses the identifier to send the IPC message to the appropriate process.

Figure 4:
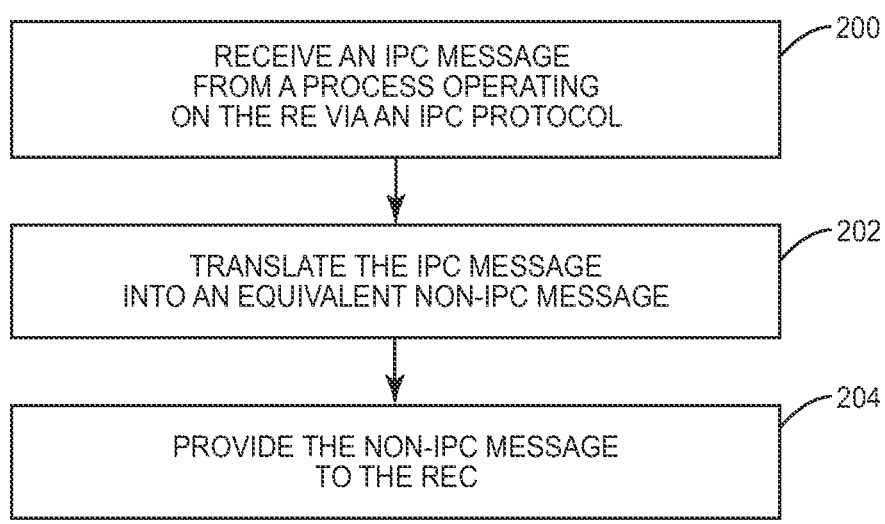
FIG. 4 illustrates the operation of the virtual IPC translator of the RE of FIG. 2 to translate outgoing IPC messages into equivalent non-IPC messages according to one embodiment of the present disclosure.

FIG. 4 illustrates the operation of the IPC translator 20 of the RE 16 of FIG. 2 to translate outgoing IPC messages into equivalent non-IPC messages according to one embodiment of the present disclosure. First, the IPC translator 20 receives an IPC message from a process operating on the RE 16 via an internal communication link within the RE 16 (step 200). In one embodiment, the internal communication link is a communications link provided within software executing on the RE 16 (e.g., a communications link provided by an operating system of the RE 16). For instance, the IPC translator 20 may receive the IPC message from the corresponding process via a link handler.

Next, the IPC translator 20 translates the IPC message into an equivalent non-IPC message in a format specified for the REC 18 (step 202). The details of the translation depend on the particular implementation of the RE 16 and the REC 18. For instance, the details of the translation depend, at least in part, on the IPC protocol supported by the RE 16. In one embodiment, the IPC protocol supported by the RE 16 is LINX. In this particular embodiment, the RE 16 is designed to use LINX for inter-process communication between processes on the RE 16 and a connected REC over a CPRI interface. However, since the REC 18 does not support IPC, the IPC translator 20 translates the LINX message into a corresponding non-LINX signal, or message, which is the equivalent non-IPC message. For example, if the IPC message is an operations and maintenance message provided in a format specified for the RE 16, the IPC translator 20 first unwraps the IPC message to remove the IPC (e.g., LINX) wrapper and then translates the operations and maintenance message into an equivalent operations and maintenance message in a format specified for the REC 18. Lastly, the IPC translator 20 provides, or sends, the equivalent non-IPC message to the REC 18 via the interface connecting the RE 16 to the REC 18 (step 204). Again, in one embodiment, the interface connecting the RE 16 and the REC 18 is a CPRI interface.

Figure 5:
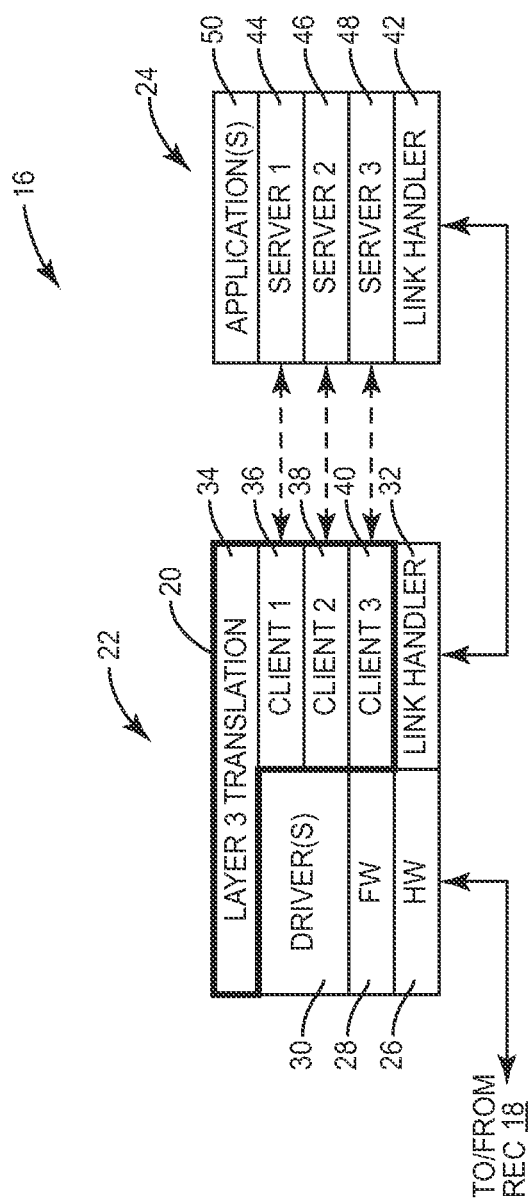
FIG. 5 illustrates an embodiment of the RE of FIG. 2 wherein translation of IPC messages is performed by a Layer 3 translation function according to one exemplary embodiment of the present disclosure.

FIG. 5 a protocol stack for one embodiment of the RE 16 of FIG. 2 including the IPC translator 20. As illustrated, the RE 16 includes a first protocol stack 22 comprising the IPC translator 20 and an IPC-enabled protocol stack 24. The first protocol stack 22 includes a hardware layer 26, a firmware layer 28, one or more drivers 30, the IPC translator 20, and a link handler 32. In one exemplary implementation, the hardware layer 26 and the firmware layer 28 form a CPRI interface of the RE 16. Specifically, the hardware layer 26 forms Layer 1 of the CPRI interface, and the firmware layer 28 forms Layer 2 of the CPRI interface. In addition, the one or more drivers 30 operate to provide High-level Data Link Control (HDLC) and Link Access Protocol, Balanced (LAPB) signaling. However, the RE 16 is not limited thereto. The IPC translator 20 includes a Layer 3 translation function 34 and a number of client processes 36 through 40. Note that while there are three client processes 36 through 40 in this embodiment, the RE 16 may include any number of one or more client processes depending on the particular implementation.

The IPC-enabled protocol stack 24 is generally a protocol stack that is designed for IPC. The IPC-enabled protocol stack 24 includes a link handler 42, a number of server processes 44 through 48, and one or more applications 50. The server processes 44 through 48 correspond to the client processes 36 through 40, respectively. For example, the client process 36 and the server process 44 may exchange IPC messages related to data control (e.g., carrier setup and activation, carrier deactivation, uplink and downlink fault handling, or the like) via an internal communication link handled by the link handlers 32 and 42, the client process 38 and the server process 46 may exchange IPC messages related to board control (e.g., board restart, get capabilities, board fault handling, or the like) via the internal communication link handled by the link handlers 32 and 42, and the client process 40 and the server process 48 may exchange IPC messages related to radio interface control (e.g., messages relating to a CPRI link between the RE 16 and the REC 18 such as, for instance, I&Q AxC configuration, timing information, delay, or the like) via the internal communication link handled by the link handlers 32 and 42. As discussed below, the Layer 3 translation function 34 and the client processes 36 through 40 enable virtual IPC signaling, or messaging, between the IPC-enabled protocol stack 24 and the REC 18 in such a manner that the IPC signaling is transparent to the REC 18. In other words, the Layer 3 translation function 34 translates messages while the client processes 36 through 40 operate to send IPC messages to and receive IPC messages from the corresponding server processes 44 through 48 on behalf of the REC 18. In this manner, virtual IPC signaling is provided between the RE 16 and the REC 18.

Figure 6:
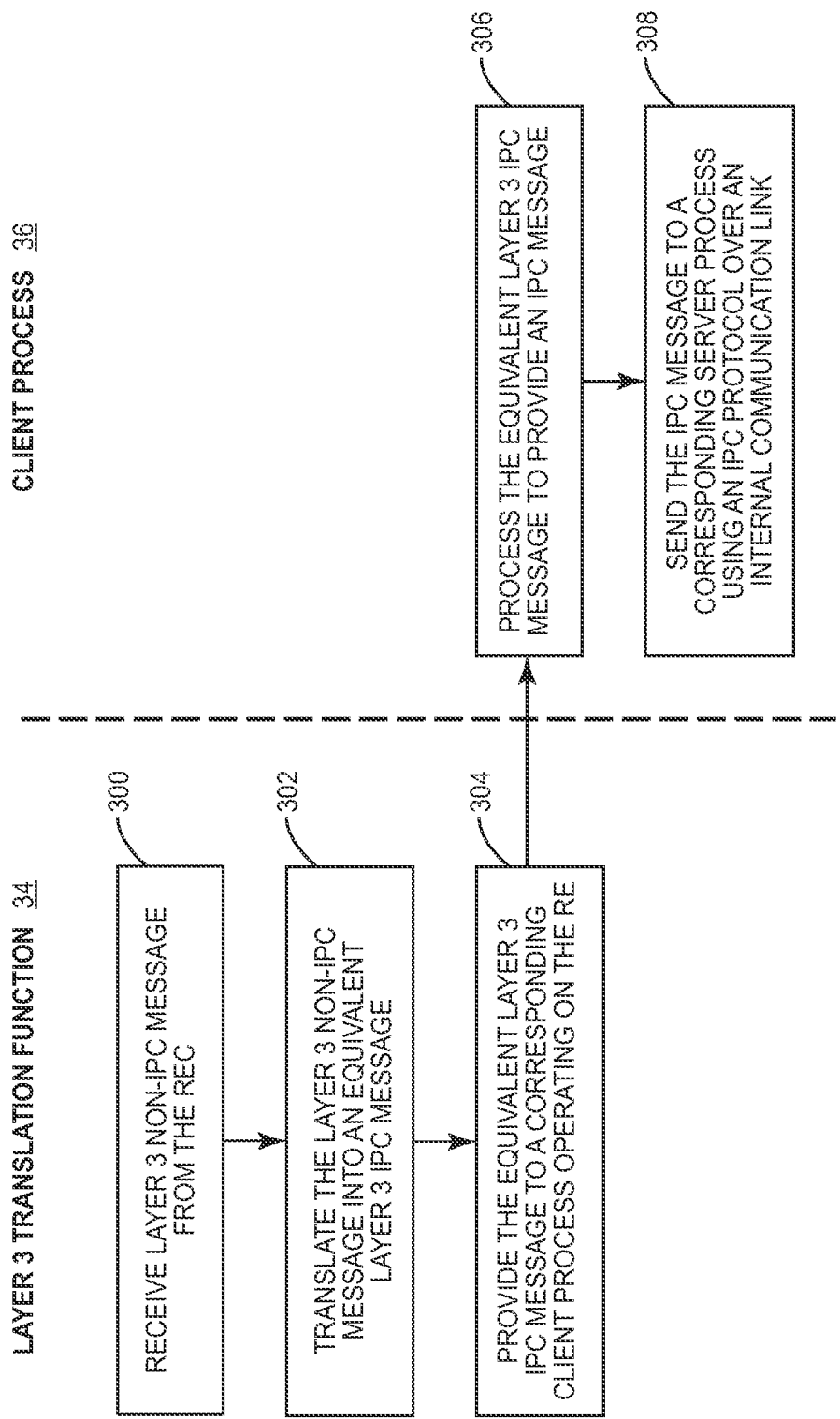
FIG. 6 is a flow chart illustrating the operation of the RE of FIG. 5 to translate incoming non-IPC messages into equivalent IPC messages according to one embodiment of the present disclosure.

FIG. 6 illustrates the operation of the IPC translator 20 of the RE 16 of FIG. 5 to translate incoming non-IPC messages into equivalent IPC messages according to one embodiment of the present disclosure. First, the Layer 3 translation function 34 of the IPC translator 20 receives a Layer 3 non-IPC message from the REC 18 via the hardware layer 26, the firmware layer 28, and the one or more drivers 30 (step 300). In one embodiment, the Layer 3 non-IPC message is an operations and maintenance message (i.e., a message related to operations and/or maintenance) provided on a control plane of the communication link between the RE 16 and the REC 18.

Next, the Layer 3 translation function 34 translates the Layer 3 non-IPC message into an equivalent Layer 3 IPC message (step 302). The details of the translation depend on the particular implementation of the RE 16 and the REC 18. For instance, the details of the translation depend on the IPC protocol supported by the RE 16. In one embodiment, the IPC protocol supported by the RE 16 is LINX and, as such, the equivalent Layer 3 IPC message is an equivalent Layer 3 LINX message. For example, if the Layer 3 non-IPC message is an operations and maintenance message provided in a format specified for the REC 18, the Layer 3 translation function 34 translates the message into an equivalent operations and maintenance message in a format specified for the RE 16 and then wraps the equivalent operations and maintenance message inside a LINX signal, or message, to thereby provide the equivalent IPC message.

The Layer 3 translation function 34 then provides, or sends, the equivalent Layer 3 IPC message to a corresponding one of the client processes 36 through 40 (step 304). More specifically, each of the client processes 36 through 40 handles a particular type or types of IPC messages. As such, the Layer 3 translation function 34 provides the equivalent Layer 3 IPC message to the client process that is responsible for handling the equivalent Layer 3 IPC message.

In this example, the equivalent Layer 3 IPC message is provided to the client process 36. The client process 36 then processes the equivalent Layer 3 IPC message to provide an IPC message to be provided to the corresponding server process 44 (step 306). For example, if the IPC protocol supported by the RE 16 is LINX, the client process 36 wraps the equivalent Layer 3 IPC message in a LINX message to thereby provide the IPC message to be provided to the corresponding server process. The client process 36 then sends the IPC message to the corresponding server process 44 using the IPC protocol (e.g., LINX) supported by the RE 16 using the internal communication link provided by the link handlers 32 and 42 (step 308). The internal communication link is preferably a software link such as, for example, a software link provided by an operating system of the RE 16. For example, if the IPC protocol is LINX, the IPC message includes an identifier that identifies the server process 44 as the server process to which the IPC message is to be delivered. Based on the identifier, the link handlers 32 and 42 deliver the IPC message to the server process 44.

Figure 7:
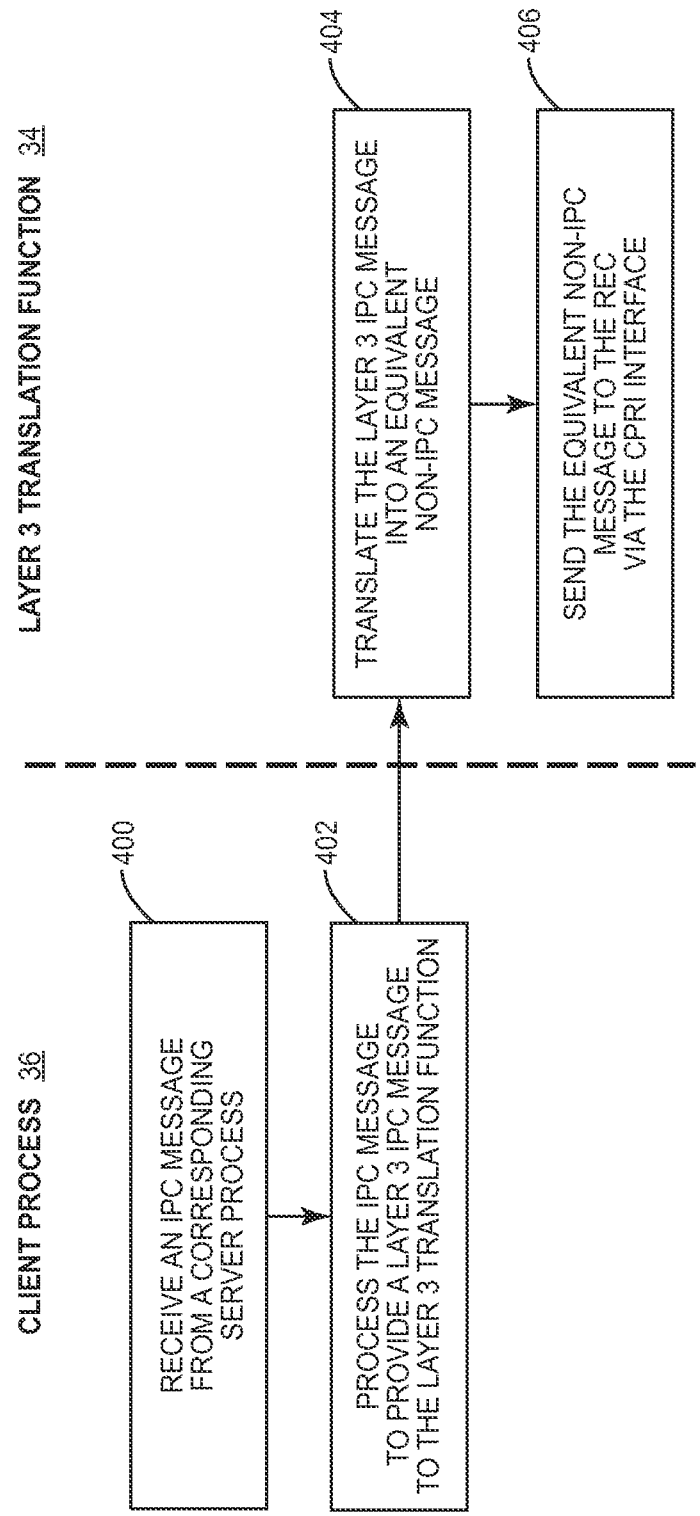
FIG. 7 is a flow chart illustrating the operation of the RE of FIG. 5 to translate outgoing IPC messages into equivalent non-IPC messages according to one embodiment of the present disclosure.

FIG. 7 illustrates the operation of the IPC translator 20 of the RE 16 of FIG. 5 to translate outgoing IPC messages into equivalent non-IPC messages according to one embodiment of the present disclosure. First, in this example, the client process 36 receives an IPC message from the corresponding server process 44 via the internal communication link provided by the link handlers 32 and 42 (step 400). The client process 36 then processes the IPC message to provide a Layer 3 IPC message to the Layer 3 translation function 34 (step 402). For example, if the IPC message is an operations and maintenance message provided in a format specified for the RE 16, the client process 36 unwraps the IPC message to remove the IPC (e.g., LINX) wrapper to thereby provide the Layer 3 IPC message. Next, the Layer 3 translation function 34 translates the Layer 3 IPC message to provide an equivalent non-IPC message in a format specified for the REC 18 (step 404). Lastly, the Layer 3 translation function 34 provides, or sends, the equivalent non-IPC message to the REC 18 via the one or more drivers 30, the firmware layer 28, and the hardware layer 26 (step 406).

Figure 8:
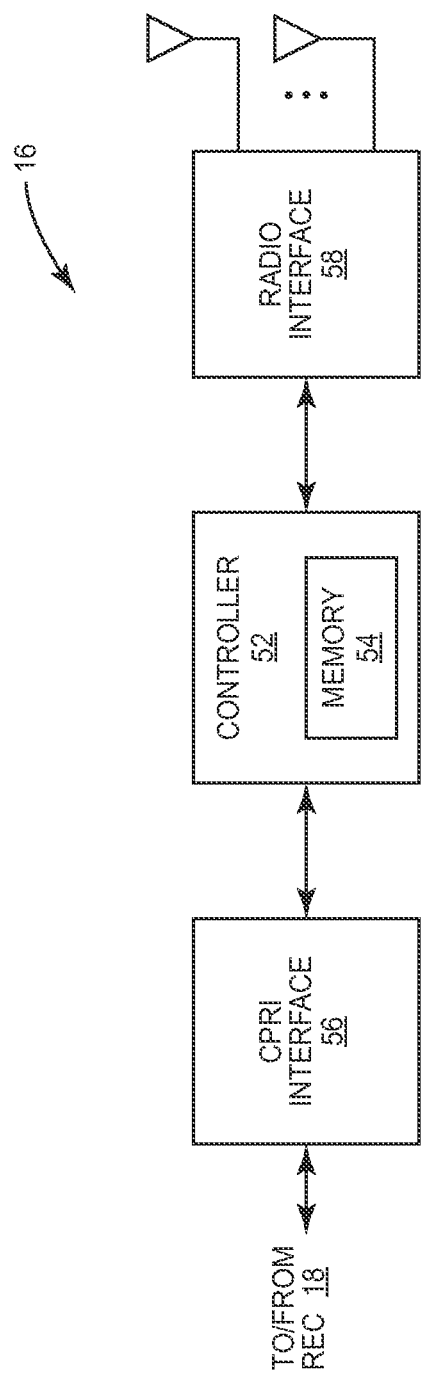
FIG. 8 is a block diagram of the RE of FIG. 2 according to one embodiment of the present disclosure.

FIG. 8 is a block diagram of an exemplary embodiment of the RE 16. As illustrated, in this embodiment, the RE 16 includes a controller 52 having associated memory 54, a CPRI interface 56, and a radio interface 58. The controller 52 is a microprocessor, ASIC, Field Programmable Gate Array (FPGA), or similar hardware controller. In this particular embodiment, the controller 52 is a microprocessor that executes software stored in the memory 54 to provide the functionality described herein (i.e., IPC translation, etc). The CPRI interface 56 provides a CPRI link between the RE 16 and the REC 18. The radio interface 58 provides radio frequency wireless communication channels between the base station 12 and mobile stations, such as the mobile station 14, within the coverage area of the base station 12.

The embodiments of the RE 16 providing virtual IPC signaling described herein provide numerous advantages over conventional REs. Some exemplary, non-limiting advantages include: reusing the IPC-enabled protocol stack, enabling the REC 18 to use functions of the RE 16 that would typically require the REC 18 to support IPC, reusing the RE 16 which is desired for IPC with RECs that do not support IPC, and creating a virtual IPC control interface between the RE 16 and the REC 18 where IPC signaling is transparent to the REC 18.

The following acronyms are used throughout this disclosure.
ASIC Application Specific Integrated Circuit
CPRI Common Public Radio Interface (see, for example, CPRI Specification V4.0 (2008 Jun. 30))
E-UTRA Evolved Universal Mobile Telecommunication System Terrestrial Radio Access
FPGA Field Programmable Gate Array
HDLC High-level Data Link Control IPC Inter-Process Communication
LAPB Link Access Protocol, Balanced
LINX An open Inter-Process Communications protocol
RE Radio Equipment
REC Radio Equipment Controller
UMTS Universal Mobile Telecommunication System
WiMAX Worldwide Interoperability for Microwave Access, Inc. (group promoting IEEE 802.16 wireless broadband standard)

Those skilled in the art will recognize improvements and modifications to the preferred embodiments of the present disclosure. All such improvements and modifications are considered within the scope of the concepts disclosed herein and the claims that follow.

What is claimed is:
1. A method of operation of a radio equipment connected to a radio equipment controller that together form at least a part of a base station in a wireless communication system, comprising:

receiving, by the radio equipment, a non-IPC message from the radio equipment controller;
translating, by the radio equipment, the non-IPC message into an equivalent IPC message; and
providing the equivalent IPC message to a corresponding process operating on the radio equipment.

2. The method of claim 1 wherein the non-IPC message is a message provided to the radio equipment from the radio equipment controller according to a protocol that does not support inter-process communication.

3. The method of claim 1 wherein the equivalent IPC message is a message provided according to an inter-process communication protocol supported by the radio equipment.

4. The method of claim 1 wherein a plurality of processes are operating on the radio equipment, and providing the equivalent IPC message to the corresponding process comprises providing the equivalent IPC message to one of the plurality of processes that is responsible for handling the equivalent IPC message.

5. The method of claim 1 wherein providing the equivalent IPC message to the corresponding process comprises sending the equivalent IPC message to the corresponding process via a communication link internal to the radio equipment according to an inter-process communication protocol supported by the radio equipment.

6. The method of claim 5 wherein the inter-process communication protocol is LINX.

7. The method of claim 1 wherein receiving the non-IPC message comprises receiving a Layer 3 non-IPC message from the radio equipment controller via a common public radio interface of the radio equipment.

8. The method of claim 7 wherein translating the non-IPC message comprises translating the Layer 3 non-IPC message into an equivalent Layer 3 IPC message for an inter-process communication protocol supported by the radio equipment.

9. The method of claim 8 wherein a plurality of client processes are operating on the radio equipment, and translating the non-IPC message further comprises providing the equivalent Layer 3 IPC message to a corresponding one of the plurality of client processes.

10. The method of claim 9 wherein a plurality of server processes are operating on the radio equipment and each server process of the plurality of server processes corresponds to a different one of the plurality of client processes, and further wherein translating the non-IPC message further comprises processing the equivalent Layer 3 IPC message by the corresponding one of the plurality of client processes to thereby provide the equivalent IPC message.

11. The method of claim 10 wherein providing the equivalent IPC message to the corresponding process operating on the radio equipment comprises sending the equivalent IPC message from the corresponding one of the plurality of client processes to a corresponding one of the plurality of server processes via a communication link that is internal to the radio equipment according to the inter-process communication protocol supported by the radio equipment.

12. The method of claim 11 wherein the inter-process communication protocol is LINX.

13. The method of claim 1 wherein the wireless communication system is one of a group consisting of: a UMTS wireless communication system, a WiMAX wireless communication system, and an E-UTRA wireless communication system.

14. A radio equipment comprising:
a common public radio interface adapted to communicatively couple the radio equipment to a radio equipment controller, where together the radio equipment and the radio equipment controller form at least a part of a base station in a wireless communication system; and a controller connected to the common public radio interface that is adapted to:

receive a non-IPC message from the radio equipment controller via the common public radio interface;

translate the non-IPC message into an equivalent IPC message; and provide the equivalent IPC message to a corresponding process operating on the radio equipment.

15. The radio equipment of claim 14 wherein the non-IPC message is a message provided to the radio equipment from the radio equipment controller according to a protocol that does not support inter-process communication.

16. The radio equipment of claim 14 wherein the equivalent IPC message is a message provided according to an inter-process communication protocol supported by the radio equipment.

17. The radio equipment of claim 14 wherein a plurality of processes are operating on the radio equipment, and the corresponding process is one of the plurality of processes that is responsible for handling the equivalent IPC message.

18. The radio equipment of claim 14 wherein the controller is further adapted to provide the equivalent IPC message to the corresponding process via a communication link internal to the radio equipment according to an inter-process communication protocol supported by the radio equipment.

19. The radio equipment of claim 18 wherein the inter-process communication protocol is LINX.

20. The radio equipment of claim 14 wherein, in order to receive the non-IPC message, the controller is further adapted to receive the non-IPC message from the radio equipment controller as a Layer 3 non-IPC message.

21. The radio equipment of claim 20 wherein, in order to translate the non-IPC message, the controller is further adapted to translate the Layer 3 non-IPC message into an equivalent Layer 3 IPC message for an inter-process communication protocol supported by the radio equipment.

22. The radio equipment of claim 21 wherein:

a plurality of client processes are operating on the radio equipment; and in order to translate the non-IPC message, the controller is further adapted to provide the equivalent Layer 3 IPC message to one of the plurality of client processes responsible for handling the equivalent Layer 3 IPC message.

23. The radio equipment of claim 22 wherein:

a plurality of server processes are operating on the radio equipment and each server process of the plurality of server processes corresponds to a different one of the plurality of client processes; and in order to translate the non-IPC message, the equivalent Layer 3 IPC message is processed by the one of the plurality of client processes to thereby provide the equivalent IPC message.

24. The radio equipment of claim 23 wherein the one of the plurality of client processes sends the equivalent IPC message to a corresponding one of the plurality of server processes via a communication link that is internal to the radio equipment according to the inter-process communication protocol supported by the radio equipment.

25. The radio equipment of claim 24 wherein the inter-process communication protocol is LINX.

26. The radio equipment of claim 14 wherein the wireless communication system is one of a group consisting of: a UMTS wireless communication system, a WiMAX wireless communication system, and an E-UTRA wireless communication system.

27. A non-transitory computer readable medium storing software for instructing a controller of a radio equipment to:

receive a non-IPC message from a radio equipment controller, where together the radio equipment and the radio equipment controller form at least part of a base station in a wireless communication system;

translate the non-IPC message into an equivalent IPC message; and provide the equivalent IPC message to a corresponding process operating on the radio equipment.

28. A method of operation of a radio equipment connected to a radio equipment controller that together form at least a part of a base station in a wireless communication system, comprising:

translating, by the radio equipment, an IPC message into an equivalent non-IPC message; and providing the equivalent non-IPC message from the radio equipment to the radio equipment controller.

29. The method of claim 28 wherein translating the IPC message into the equivalent non-IPC message comprises:

providing the IPC message from a server process operating on the radio equipment to a corresponding client process operating on the radio equipment via a communication link that is internal to the radio equipment according to an inter-process communication protocol supported by the radio equipment;

processing the IPC message by the corresponding client process to provide a Layer 3 IPC message; and translating the Layer 3 IPC message into the equivalent non-IPC message.

30. A radio equipment comprising:

a common public radio interface adapted to communicatively couple the radio equipment to a radio equipment controller, where together the radio equipment and the radio equipment controller form at least a part of a base station in a wireless communication system; and a controller connected to the common public radio interface that is adapted to:

translate an IPC message into an equivalent non-IPC message; and provide the equivalent non-IPC message from the radio equipment to the radio equipment controller via the common public radio interface.

31. The radio equipment of claim 30 wherein in order to translate the IPC message into the equivalent non-IPC message, the controller is further adapted to:

provide the IPC message from a server process operating on the radio equipment to a corresponding client process operating on the radio equipment via a communication link that is internal to the radio equipment according to an inter-process communication protocol supported by the radio equipment, wherein the corresponding client process processes the IPC message to provide a Layer 3 IPC message; and translate the Layer 3 IPC message into the equivalent non-IPC message.

32. A non-transitory computer readable medium storing software for instructing a controller of a radio equipment to:

translate an IPC message into an equivalent non-IPC message; and provide the equivalent non-IPC message from the radio equipment to a radio equipment controller, where together the radio equipment and the radio equipment controller form at least part of a base station in a wireless communication system.

\* \* \* \* \*